United States Patent Office 2,790,792
Patented Apr. 30, 1957

2,790,792

REDUCTION OF STREPTOMYCINS

Murray Arthur Kaplan, Syracuse, N. Y., assignor to Bristol Laboratories Inc., Syracuse, N. Y., a corporation of New York No Drawing. Application February 2, 1953,
Serial No. 334,759

11 Claims. (Cl. 260—210)

This invention relates to a process of preparing dihydro-streptomycins and more particularly to a process for the chemical reduction of certain streptomycins by the use of certain borohydrides.

It is well-known that many physicians prefer to use the hydrogenated forms of the antibiotics streptomycin and hydroxystreptomycin. These are prepared at present by using catalytic hydrogenation but improved methods are desired because of the expense of the catalysts and the special hydrogenation equipment and the amount of labor and time required to recover these catalysts, to regenerate them and to operate the complicated equipment.

It is the object of this invention to provide a simpler, less expensive, more specific, more efficient and faster process for the conversion of streptomycin and hydroxy-streptomycin and their non-toxic salts to the dihydro form.

These objects have been achieved and there is now discovered according to the present invention a process of reacting a solution of a member selected from the group consisting of streptomycin, hydroxy-streptomycin and their non-toxic salts with at least one equivalent of a member selected from the group consisting of sodium borohydride, potassium borohydride, sodium trimethoxy-borohydride and potassium trimethoxyborohydride to produce the corresponding member selected from the group consisting of dihydro-streptomycin, dihydro-hydroxstreptomycin and their non-toxic salts.

These reductions are preferably carried out in water at room temperature and atmospheric pressure. Other useful liquid reaction media are methanol, propylene glycol and formamide for streptomycin hydrochloride, formamide for streptomycin sulfate and 2-aminoheptane for streptomycin free base. Any of the solvents listed for the borohydrides are useful provided that they dissolve the streptomycin used. The solution of the reduced product may be subjected to further steps, such as purification via carbon treatment or via adsorption on and elution from ion exchange resins or conversion to different salts, or the solid product may be isolated directly from this solution, as by pouring an aqueous solution of dihydrostreptomycin sulfate into methanol. Acid may be added to this solution to decompose unreacted borohydride but this is not essential where the borohydride remains in solution and the product is insoluble as is dihydrostreptomycin sulfate in aqueous methanol. Other agents, such as triethylamine to reduce gassing, may be added but are not essential. Not all of the borohydride need be in solution, as when a slurry of sodium trimethoxyborohydride is used and any unreacted excess is removed at the end, e. g. by decantation or filtration. The starting material may be of any purity and even filtered streptomycin broth may be reduced; it is apparent, however, that the purity of the product is proportional to the purity of the starting material.

Various salts of streptomycin or dihydrostreptomycin are described in U. S. Patents 2,594,245; 2,583,534; 2,578,840; 2,537,941; 2,537,934; 2,537,933; 2,531,869; 2,522,858; 2,505,318; 2,481,267; 2,449,866; and 2,446,102.

The reducing agent of the present invention is a member selected from the group consisting of sodium borohydride ($NaBH_4$), potassium borohydride ($KBH_4$), sodium trimethoxy borohydride ($NaBH(OCH_3)_3$) and potassium trimethoxy borohydride ($KBH(OCH_3)_3$).

These boron hydrides possess many advantages over lithium aluminum hydride and over hydrogen plus catalysts, such as palladium, platinum and nickel in the hydrogenation of streptomycin to dihydrostreptomycin. These hydrides are available at reasonable cost, they are indefinitely stable at room temperature when stored with reasonable precautions, they may be used in a wide variety of solvents, particularly in water, they may be used in reductions carried out at room temperature or below and they possess a highly favorable ratio of reducing capacity to weight. Thus one pound of $NaBH_4$ is theoretically capable of reducing 61.5 pounds of streptomycin as the free base. Reductions are usually very rapid and in many cases nearly quantitative. Side reactions are few and products are usually obtained in a high state of purity, thus obviating difficult purifications. No special equipment is required to carry out the hydride reduction, in contrast to the expensive and elaborate high pressure equipment used for catalytic hydrogenations. Unlike the metal catalysts, the hydrides are not subject to "poisoning," which becomes a serious problem when the metal catalysts are used to reduce crude material. These hydrides are also very specific in their point of attack upon such a molecule as streptomycin. These hydrides, unlike lithium aluminum hydride, do not require non-aqueous and non-hydroxylic solvents.

Sodium borohydride ($NaBH_4$) is a white to gray-white microcrystalline powder containing four moles of available hydrogen per mole. It is stable in dry air, decomposes very slowly in moist air and reacts inappreciably with water at room temperature but rapidly at 50° C. or in the presence of acids or certain metal cations such as $Co^{++}$ and $Ni^{++}$. Preferred solvents for use with sodium borohydride are water (55), alcohols (e. g. methanol, ethanol (4 RS), isopropyl alcohol (0.25 RS)), amines (e. g. isopropylamine (10), morpholine (1), pyridine (3)), dioxane, tetrahydrofuran (SS), and dimethyl-Cellosolve (0.8). The figures in parentheses are the approximate solubilities in grams per 100 g. solvent at 20° C.; RS means reacts slowly; SS means slightly soluble. Sodium borohydride is generally insoluble in ethers, hydrocarbons and alkyl chlorides. In general, sodium borohydride will reduce only the carbonyl group of aldehydes, ketones and acid chlorides. It does not react with acids, esters, anhydrides, olefinic double bonds, nitriles, alkyl halides nor aryl halides. In the reduction of the aldehyde group of streptomycin to the primary alcohol group of dihydrostreptomycin, theoretically 0.25 mole of $NaBH_4$ is required for each mole of streptomycin; usually a small excess of sodium borohydride is used, e. g. 10 or 20 percent. The reduction of streptomycin proceeds rapidly at room temperature and the aqueous or alcoholic solutions are used and preferred. The equation for the reaction is

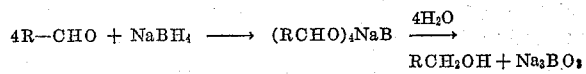

$$4R\text{—}CHO + NaBH_4 \longrightarrow (RCHO)_4NaB \xrightarrow{4H_2O} RCH_2OH + Na_3BO_3$$

where RCHO represents streptomycin and $RCH_2OH$ represents dihydrostreptomycin. Potassium borohydride ($KBH_4$) possesses similar properties and the same degree of reactivity as sodium borohydride and may be used in its place.

Sodium trimethoxy borohydride ($NaBH(OCH_3)_3$) is a fine white microcrystalline powder containing one mole of available hydrogen per mole. It reacts slowly with humid air and must be kept in tightly sealed containers. It reacts vigorously with water and alcohols such as ethanol but may be used in the presence of such agents under certain conditions, e. g. at low temperatures. Useful solvents include dioxane (1.6) and amines, e. g. isopropylamine (9.0), ethylenediamine (0.2), pyridine (0.4) and morpholine (0.3); the figures in parentheses are the approximate solubilities in grams per 100 g. solvent at 25° C. This product is active both in solution and as a slurry and reduces aldehydes to the corresponding primary alcohols, e. g. streptomycin to dihydrostreptomycin. Potassium trimethoxy borohydride is equivalent to sodium trimethoxy borohydride in properties and utility.

Further understanding of the invention may be obtained by reference to the following examples which are illustrative only and are not the exclusive embodiment of the invention.

*Example I*

Five gms. of a purified streptomycin sulfate (769 u./mgm.) was dissolved in 35 ml. of water to give an approximate 100,000 u./ml. solution. To this solution, 0.3 gm. of $NaBH_4$ (approximately 4.6 equivalents) in 10 ml. of water was added with rapid stirring at room temperature and atmospheric pressure. Some gas was evolved. A contact time of no longer than one minute was allowed. At this point dilute $H_2SO_4$ was added to decompose excess $NaBH_4$; to break the streptomycin-boron complex and to bring the pH down to about 2.0 (indicator paper used). This sparkling clear acidified solution was added to 350 mls. of methanol at once. The resulting precipitate was washed with methanol and dried at house vacuum. Five and one tenth gms. of solids were recovered showing a biological potency of 700 dihydro-coli units per mgm. At 1 mgm./ml. these chemically reduced streptomycin sulfate solids gave no maltol test by the standard chemical assay at 1 mgm./ml. indicating essentially complete reduction.

| Solid | Wt. gm. | Type of Assay | u./mgm. | Total u. | Percent |
|---|---|---|---|---|---|
| Starting Material | 5.0 | Chemical | 769 | 3.94 M | |
| $NaBH_4$ reduced | 5.1 | Dihydro-coli | 700 | 3.57 M | 90.5 |

*Example II*

The procedure of Example I was followed except that aqueous ammonium hydroxide was added to bring the pH of the aqueous streptomycin solution up to 8.4 before the addition of the $NaBH_4$. The dihydrostreptomycin sulfate isolated weighed 5.4 grams and bio-assayed 651 units/mgm. for a recovery of 3.53 M or 89.5% recovery and gave no maltol test at 1 mgm./ml. indicating essentially complete reduction.

*Example III*

Aqueous $NaBH_4$ is added to an aqueous solution of streptomycin sulfate. Both sterptomycin and streptomycin sulfate are essentially insoluble in anhydrous methanol, so this is not used as the solvent. A contact time of from one to thirty minutes is allowed at room temperature and atmospheric pressure. Some gas evolution is noted and can be markedly reduced by prior addition of triethylamine to about pH 8.5. The reaction mixture, which warms slightly, may be added directly to methanol to precipitate dihydrostreptomycin sulfate. Any excess $NaBH_4$ remains in the mother liquor. The reaction mixture may also be acidified with sulfuric acid to about pH 2 to break up boron complexes. The addition of this solution to methanol precipitates dihydrostreptomycin sulfate contaminated with sodium sulfate which is removed by recrystallization; and boric acid and sodium borate remain in solution. Overall activity recoveries are excellent and the reduction is essentially complete. In one series of experiments, the percentage reduction in ten minutes ranged from 98.5 to 99.7%. It is not necessary to use an excess of $NaBH_4$ but it is convenient to use a ten or twenty percent excess of the $NaBH_4$, particularly in small scale runs, and a greater excess may be used if desired.

*Example IV*

Five grams of tan hydroxy-streptomycin phosphate was dissolved in 30 mls. water, one hundred fifty mgms. of $NaBH_4$ was added and the mixture was allowed to react for five minutes at room temperature and atmospheric pressure. Gassing and decolorization was noted. The mixture was added to 250 mls. methanol. On standing, there precipitated and was recovered white dihydro-hydroxystreptomycin phosphate (4.5 g.).

| Solid | Wt., g. | Maltol Assay, units/mgm. | Total Units and Assay | Bioassay, units/mgm. |
|---|---|---|---|---|
| Starting Material | 5.0 | 381 | 1.9 M—chemical | 465 |
| Product | 4.5 | 18.6 | 1.86 M—biological | 415 |

Reduction proceeded to the extent of at least 95.1%; the potency recovery was 97.5% by biological assay.

*Example V*

Twenty-three grams of streptomycin sulfate dissolved in 120 ml. water was reacted with 800 mgms. of $NaBH_4$ for thirty minutes at room temperature. The reaction mixture was added to 850 ml. methanol. Dihydrostreptomycin sulfate (23 g.) precipitated and was recovered. Results:

| Solid | Maltol Assay, units/mgm. | Bioassay, units/mgm. | Reduction, percent | Recovery, percent |
|---|---|---|---|---|
| Starting Material | 820 | 637 | | |
| Product | 9 | 650 | 98.9 | 100 |

*Example VI*

Sixty-five mls. of crude aqueous streptomycin sulfate was reacted with 150 mgms. $NaBH_4$ (three equivalents based on potency) for fifteen minutes at room temperature. The reaction mixture was added to five volumes of methanol and 4.4 g. solid dihydrostreptomycin sulfate precipitated and was recovered by filtration. Results:

| Solids | Maltol Assay | Bioassay | Reduction, percent |
|---|---|---|---|
| Starting Material, 65 ml. | 39,100 units/ml | 35,200 units/ml | |
| Product | 11 units/mgm | 588 units/mgm | 98.1 |

It will be understood that, without departing from the spirit of the invention or the scope of the claims, various modifications may be made in the specific expedients described. The latter are illustrative only and are not offered in a restricting sense, and there is no intention of excluding any equivalents of the features shown and described or portions thereof.

I claim:

1. A process of reacting a solution of a member selected from the group consisting of streptomycin, hydroxystreptomycin and their non-toxic salts with at least one equivalent of a member selected from the group consisting of sodium borohydride, potassium borohydride, sodium trimethoxyborohydride and potassium trimethoxyborohydride to produce the corresponding member selected from the group consisting of dihydrostreptomycin, dihydrohydroxystreptomycin and their non-toxic salts.

2. A process of reacting a solution of a member selected from the group consisting of streptomycin, hydroxystreptomycin and their non-toxic salts with at least one equivalent of sodium borohydride to produce the corresponding member selected from the group consisting of dihydrosreptomycin, dihydro-hydroxystreptomycin and their non-toxic salts.

3. A process of reacting a solution of a member selected from the group consisting of streptomycin, hydroxystreptomycin and their non-toxic salts with at least one equivalent of potassium borohydride to produce the corresponding member selected from the group consisting of dihydrostreptomycin, dihydro-hydroxystreptomycin and their non-toxic salts.

4. A process of reacting a solution of a member selected from the group consisting of streptomycin, hydroxystreptomycin and their non-toxic salts with at least one equivalent of sodium trimethoxyborohydride to produce the corresponding member selected from the group consisting of dihydrostreptomycin, dihydro-hydroxystreptomycin and their non-toxic salts.

5. A process of reacting a solution of a member selected from the group consisting of streptomycin, hydroxystreptomycin and their non-toxic salts with at least one equivalent of potassium trimethoxyborohydride to produce the corresponding member selected from the group consisting of dihydrostreptomycin, dihydro-hydroxystreptomycin and their non-toxic salts.

6. A process of reacting a solution of steptomycin with at least one equivalent of sodium borohydride to produce dihydrostreptomycin.

7. A process of reacting a solution of streptomycin sulfate with at least one equivalent of sodium borohydride to produce dihydrostreptomycin sulfate.

8. A process of reacting a solution of streptomycin in water with at least one equivalent of sodium borohydride to produce dihydrostreptomycin.

9. A process of reacting a solution of streptomycin sulfate in water with at least one equivalent of sodium brohydride to produce dihydrostreptomycin sulfate.

10. A process of reacting a solution of streptomycin in water with at least one equivalent of sodium borohydride to produce dihydrostreptomycin and isolating said dihydrostreptomycin.

11. A process of reacting a solution of streptomycin sulfate in water with at least one equivalent of sodium borohydride to produce dihydrostreptomycin sulfate and isolating said dihydrostreptomycin sulfate.

References Cited in the file of this patent

UNITED STATES PATENTS

| | | |
|---|---|---|
| 2,461,661 | Schlesinger | Feb. 15, 1949 |
| 2,494,968 | Schlesinger | Jan. 17, 1950 |
| 2,498,574 | Peck | Feb. 21, 1950 |
| 2,522,858 | Carboni | Sept. 19, 1950 |
| 2,552,547 | Fried et al. | May 15, 1951 |
| 2,565,653 | Fried et al. | Aug. 28, 1951 |
| 2,617,755 | Benedict et al. | Nov. 11, 1952 |

OTHER REFERENCES

Abdil-Akher et al.: "Reduction of Sugars with Sodium Borohydride," J. Am. Chem. Soc., vol. 73 (1951), pp. 4691–92.